F. McILVENNA & J. G. ROLLASON.
Assignors to J. CADBURY & W. P. THOMPSON.
TROUSERS STRETCHER.
No. 10,808. Reissued Feb. 22, 1887.
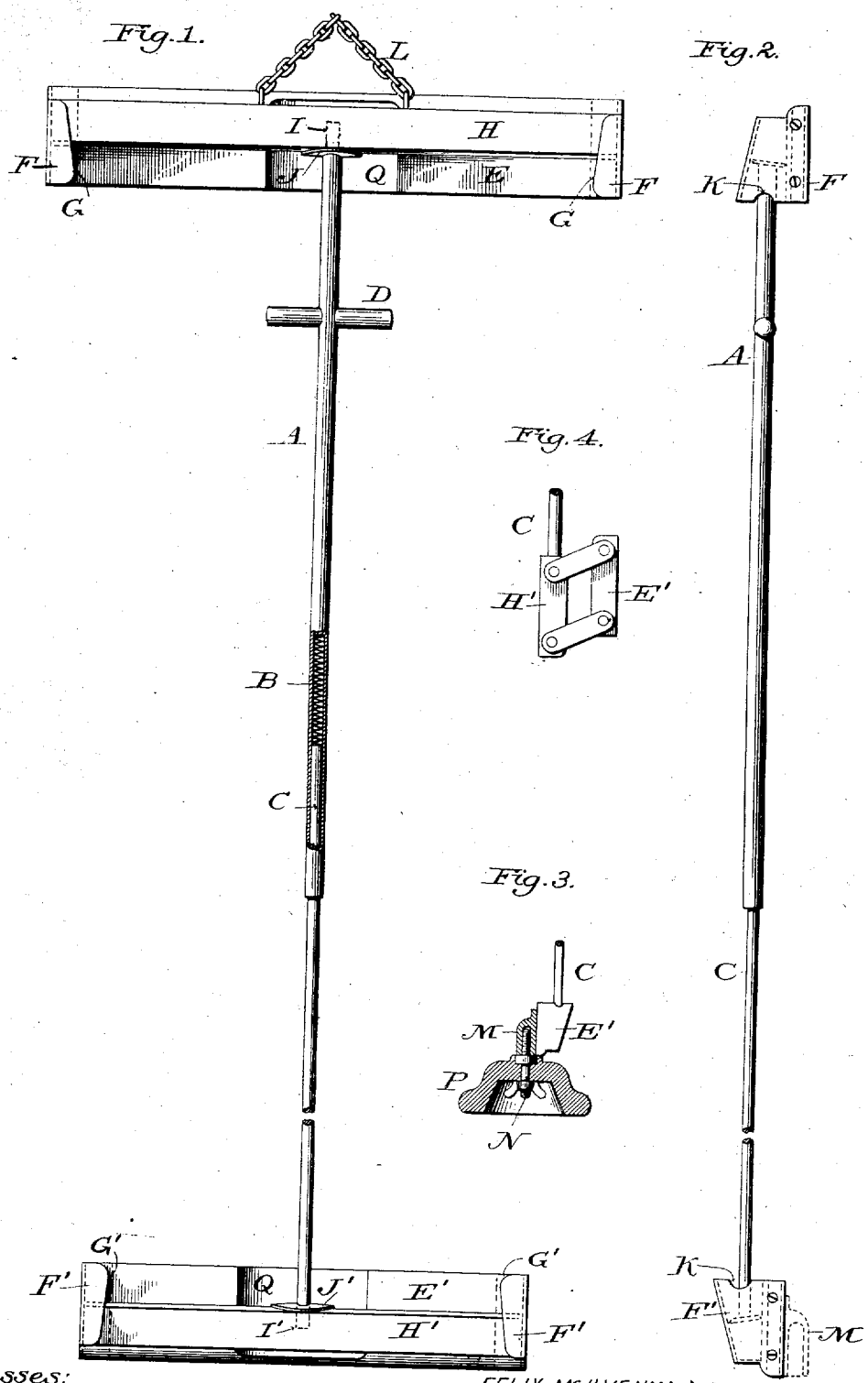
Witnesses:
James F. DeKamel
Walter S. Dodge
FELIX McILVENNA
JOSEPH G. ROLLASON } Inventors,
by Dodger Bros.
their Attys.

UNITED STATES PATENT OFFICE.

FELIX McILVENNA, OF MANCHESTER, COUNTY OF LANCASTER, AND JOSEPH GEORGE ROLLASON, OF BIRMINGHAM, COUNTY OF WARWICK, ASSIGNORS TO JOEL CADBURY, OF BIRMINGHAM, AND WM. PHILLIPS THOMPSON, OF LIVERPOOL, ENGLAND.

TROUSERS-STRETCHER.

SPECIFICATION forming part of Reissued Letters Patent No. 10,808, dated February 22, 1887.

Original No. 337,071, dated March 2, 1886. Application for reissue filed June 12, 1886. Serial No. 205,005. Patented in England February 12, 1884, No. 3,126, and May 5, 1885, No. 5,498.

*To all whom it may concern:*

Be it known that we, FELIX McILVENNA and JOSEPH GEORGE ROLLASON, subjects of the Queen of Great Britain, and residents, respectively, of Manchester, in the county of Lancaster, and Birmingham, in the county of Warwick, England, have invented certain new and useful Improvements in Trousers-Stretchers, of which the following is a specification.

The invention herein described has been patented in Great Britain by Letters Patent dated February 12, 1884, No. 3,126, and May 5, 1885, No. 5,498.

The object of our invention is to so construct an article of the class described that it shall be simple in construction and operation, cheap, and efficient in its action.

In the drawings, Figure 1 is a face view of our improved device; Fig. 2, an edge view of the same; Fig. 3, a detail sectional view, and Fig. 4 a modification.

A indicates a tubular bar or rod containing a spring, B, at one end, and C indicates a second rod, tubular or solid, sliding into the end of rod A and bearing directly against the spring B.

E E′ are two flat plates, of metal, wood, papier-maché, or other suitable material, about two inches wide, to the ends of which metal caps F F′ are applied, as shown in Figs. 1 and 2. These caps F F′ project at right angles to the plates or bars E E′, as shown in Fig. 2, and then project a slight distance with the plates, and toward the center of the latter, as shown in Fig. 1. This construction, it will be observed, forms pockets or recesses G G′, into which the ends of the bars H H′ fit. The sockets or recesses G G′ are tapering, as shown, so that as the bars or plates H H′ are put therein and moved toward the narrow end of the socket they will be crowded toward the board or plate, and thus firmly hold the garment between them.

I I′ indicate sockets in the plates or bars H H′, into which the ends of the tubular rod A C fit, the rod A C being provided with flanges J J′ near each end to rest upon the edges of the boards H H′, as shown in Fig. 1, and by dotted lines in Fig. 2.

A chain, L, is secured to the upper side of the upper bar, H, by which to suspend the apparatus when desired.

It is often desirable to place the device with garment immediately before a fire, to dry the same quickly, and, so far as we are aware, no one has ever constructed a stretching apparatus of the class described so that it may be hung up or suspended and also set upon its base, as is desired. This we accomplish by the construction shown in Figs. 2 and 3, in which M indicates a threaded lug or projection upon the outer face of plate or bar E′, and N a thumb-screw adapted to fit therein.

P indicates a base-plate or stand, which is attached to the bar or plate E′ by means of the thumb-screw N, passing through the base-plate and into the threaded lug M, as clearly shown in Fig. 3. The base-plate P is of course recessed upon its under side to allow the thumb-nut to be out of the way when the base-plate is used.

It will readily be seen that when it is desired simply to hang the garment up to stretch it the chain L will be employed, the base-plate having been previously removed by unscrewing the nut off the screw.

The device constructed as herein described is exceedingly cheap and simple, and may be carried by travelers without inconvenience. In order to render the device as compact as possible, the caps F F′ are recessed, as at K K′, to receive the bars or rods in packing.

In some cases a handle, D, may be employed to compress the spring B, though this is not necessary.

In Fig. 4 we have shown a modification of the device, the bars E′ H′ being connected by links, which, when one of the bars is moved, urge the latter toward the stationary bar and clamp the garment. We deem the arrangement shown in Figs. 1 and 2 preferable.

The center of the flat face of each of the bars E E′ is cut out or recessed, as at Q, in order to clamp the garment at each side and stretch same evenly.

In using the device it is only necessary to spread the trousers upon the plates E E′, which are separated the required distance. The blocks or bars H H′ are then inserted with their ends under the caps F F′, and as they are crowded or wedged down into the narrow end of the sockets G G′ they clamp the garment firmly between themselves and the plates E E′. The jointed rods A C are then inserted in the blocks H H′, and the spring B, pressing upon the end of rod C, serves to spread the two frames E H and E′ H′ apart, and thus stretch the garment.

The stretcher may be hung up by means of the chain L, or set upon its base P, as is desired.

Having thus described our invention, what we claim is—

1. In combination with bars E E′, provided with wedge-shaped sockets G G′, bars H H′, inserted in said sockets, and spring-pressed rods A C, inserted in the movable bars H H′ and provided with plates J J′ to bear upon the latter.

2. In combination with bars E E′ and movable bars H H′, rod A C, inserted at its ends in movable bars H H′, and stand P, detachably secured to the outer face of the bar E′, as and for the purpose set forth.

3. In combination with frames E H E′ H′ and rods A C, provided with spring B, socket M upon the outer face of bar E, screw N, inserted in said socket, and stand P, held in place by screw N, as and for the purpose set forth.

4. In a trousers stretcher, the combination of two clamps to hold the garment each side of the portion to be stretched, said clamps consisting each of a bar having wedge-shaped sockets, and a second bar fitting within said sockets, a two-part rod extending from one clamp to the other and bearing at its extremities against the second bar of the clamp, and a spring acting upon the two parts of the rod and serving to force them apart, whereby the greater the tension the tighter will be the hold of the clamps upon the garment.

5. In a device for stretching trousers, the combination of two clamps for holding the trousers, an intermediate extensible rod or connection, and a trousers-stretching spring acting upon the two parts of said rod, and serving to move them longitudinally and to force the clamps from each other with the force required to stretch the trousers.

FELIX McILVENNA.
JOSEPH GEORGE ROLLASON.

Witnesses to the signature of Felix McIlvenna:

FRED B. LOWE,
ROBERT WARDLE,
56 *Brown Street, Manchester, Notaries' Clerks.*

Witnesses to the signature of Joseph George Rollason:

GEO. H. TAY,
LETITIA HALL.